(12) United States Patent
Fukawatase et al.

(10) Patent No.: US 8,128,122 B2
(45) Date of Patent: Mar. 6, 2012

(54) MOUNTING STRUCTURE OF KNEE AIRBAG DEVICE AND ELECTRIC POWER STEERING DRIVE MOTOR

(75) Inventors: Osamu Fukawatase, Nishikamo-gun (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 12/679,189

(22) PCT Filed: Feb. 17, 2009

(86) PCT No.: PCT/JP2009/052658
§ 371 (c)(1),
(2), (4) Date: Apr. 7, 2010

(87) PCT Pub. No.: WO2009/119184
PCT Pub. Date: Oct. 1, 2009

(65) Prior Publication Data
US 2011/0006506 A1    Jan. 13, 2011

(30) Foreign Application Priority Data
Mar. 28, 2008    (JP) .................................. 2008-087184

(51) Int. Cl.
*B60R 21/16* (2006.01)
(52) U.S. Cl. ...................... 280/730.1; 280/731; 280/750
(58) Field of Classification Search ............... 280/730.1, 280/731, 750
See application file for complete search history.

(56) References Cited

U.S. PATENT DOCUMENTS

| | | | | |
|---|---|---|---|---|
| 7,600,776 B2* | 10/2009 | Hoshino et al. | ............ | 280/730.1 |
| 7,708,310 B2* | 5/2010 | Adachi et al. | ................. | 280/731 |
| 7,753,403 B2* | 7/2010 | Fukawatase et al. | ...... | 280/730.1 |
| 7,828,320 B2* | 11/2010 | Adachi et al. | ............. | 280/730.1 |
| 7,862,079 B2* | 1/2011 | Fukawatase et al. | ......... | 280/731 |
| 7,891,700 B2* | 2/2011 | Ishida | ........................ | 280/730.1 |
| 7,938,441 B2* | 5/2011 | Fukawatase et al. | ......... | 280/731 |
| 7,988,185 B2* | 8/2011 | Adachi et al. | ............. | 280/730.1 |
| 7,997,610 B2* | 8/2011 | Fukawatase et al. | ...... | 280/728.3 |
| 8,025,311 B2* | 9/2011 | Nakayama | ................. | 280/743.2 |

(Continued)

FOREIGN PATENT DOCUMENTS
DE    102 50 405 A1    5/2003
(Continued)

OTHER PUBLICATIONS

Sep. 2, 2011 Supplementary European Search Report issued in European Patent Application No. 09725387.6.

(Continued)

*Primary Examiner* — Toan To
(74) *Attorney, Agent, or Firm* — Oliff & Berridge, PLC

(57) ABSTRACT

A knee airbag device and a drive motor for an electric power steering device are mounted to a steering column so as to achieve improved mass balance about an instrument panel reinforcement member. A drive motor for an electric power steering device is mounted at a position at the vehicle front direction side with respect to an instrument panel reinforcement member, the opposite side to the side of a knee airbag device. Namely, the knee airbag device is mounted at the vehicle rear direction side with respect to the instrument panel reinforcement member, and the electric power steering device is mounted at the vehicle front direction side of the instrument panel reinforcement member.

11 Claims, 8 Drawing Sheets

U.S. PATENT DOCUMENTS 8,056,925 B2 * 11/2011 Fukawatase et al. ......... 280/731
2007/0182134 A1 8/2007 Mizuno et al.

FOREIGN PATENT DOCUMENTS

| EP | 1 300 299 A1 | 4/2003 |
| JP | A-6-298101 | 10/1994 |
| JP | A-9-104317 | 4/1997 |
| JP | A-11-11329 | 1/1999 |
| JP | A-2002-37003 | 2/2002 |
| JP | A-2002-127916 | 5/2002 |
| JP | A-2006-62531 | 3/2006 |
| JP | A-2006-123908 | 5/2006 |
| JP | A-2007-38981 | 2/2007 |
| JP | A-2007-62542 | 3/2007 |
| JP | A-2007-131082 | 5/2007 |
| JP | A-2007-203937 | 8/2007 |
| JP | B2-3951199 | 8/2007 |
| JP | A-2008-114609 | 5/2008 |
| WO | WO 2006/120868 | 11/2006 |
| WO | WO 2008/053664 A1 | 5/2008 |

OTHER PUBLICATIONS

International Search Report for International Application No. PCT/JP2009/052658, mailed on May 26, 2009 (w/ its English translation).

* cited by examiner

MOUNTING STRUCTURE OF KNEE AIRBAG DEVICE AND ELECTRIC POWER STEERING DRIVE MOTOR

TECHNICAL FIELD

The present invention relates to a mounting structure of a knee airbag device and an electric power steering drive motor.

RELATED ART

A column mounted knee airbag device is disclosed in which a knee airbag module is disposed in a column cover that covers a steering column (see Patent Document 1 and Patent Document 2).

Patent Document 1: Japanese Patent Application Laid-Open (JP-A) No. 2007-131082

Patent Document 2: JP-A No. 2007-203937

DISCLOSURE OF THE INVENTION

Problem to be Solved by the Invention

However, generally an electric power steering device for assisting steering power of a steering wheel is provided in a location of the steering column positioned within the instrument panel. Such an electric power steering device is generally disposed in the vicinity of instrument panel reinforcement member that extends in the vehicle width direction within the instrument panel.

However, in the above described conventional examples, there has been no particular consideration given to the mounting positional relationship of the knee airbag device and the drive motor of the electric power steering device.

The present invention is made in consideration of the above circumstances and the objective thereof is to improve the mass balance about the instrument panel reinforcement member when mounting the knee airbag device and the drive motor of the electric power steering device to the steering column.

Method of Solving the Problem

A first aspect of the present invention includes: a knee airbag device including, disposed at a lower outer peripheral face side of a steering column within a column cover covering the rear end side of the steering column which is supported by an instrument panel reinforcement member extending inside an instrument panel along a vehicle width direction, a knee airbag in a folded state and an inflator capable of supplying gas to the knee airbag, configured such that when the gas supply is received the knee airbag is capable of inflating and deploying from within the column cover toward the side of a knee portion of a driver; and a drive motor in an electric power steering device, attached to the steering column as a drive source for power assisted steering and mounted at the vehicle front direction side with respect to the instrument panel reinforcement member, which is the opposite side to the side of the knee airbag device.

In the mounting structure of a knee airbag device and an electric power steering drive motor according to the first aspect, the drive motor of the electric power steering device is mounted at the vehicle front direction side with respect to the instrument panel reinforcement member, the opposite side to the side of the knee airbag device. In other words, the knee airbag device is mounted to the vehicle rear side of the instrument panel reinforcement member, and the drive motor of the electric power steering device is mounted at the vehicle front side of the instrument panel reinforcement member. Consequently, mass balance in the vehicle front-rear direction of the steering column about the instrument panel reinforcement member can be improved when the knee airbag device and the drive motor of the electric power steering device are mounted to the steering column.

A second aspect of the present invention is the mounting structure of a knee airbag device and an electric power steering drive motor of the first aspect, wherein the separation distance along the axial direction of the steering column between the center of gravity of the drive motor and the center of the instrument panel reinforcement member is set shorter than the separation distance along the axial direction of the steering column between the center of the instrument panel reinforcement member and the center of gravity of the knee airbag device.

In the mounting structure of a knee airbag device and an electric power steering drive motor according to the second aspect, the position of the center of gravity of the comparatively heavy drive motor is set nearer to the instrument panel reinforcement member than the position of the center of gravity of the comparatively light knee airbag device. Hence, the size of the moment acting on the instrument panel reinforcement member due to the mass of the drive motor, and the size of the moment acting on the instrument panel reinforcement member due to the mass of the knee airbag device, become values that are close to each other. Due to the actions of these moments being in opposite directions to each other, the moments cancel each other out. Consequently, vibration of the steering column about the instrument panel reinforcement member can be effectively suppressed during normal operation.

A third aspect of the present invention is the mounting structure of a knee airbag device and an electric power steering drive motor according to the first aspect or the second aspect, wherein: the center of gravity of the drive motor is positioned at the vehicle upper side of the center of the instrument panel reinforcement member; and the center of gravity of the knee airbag device is positioned at the vehicle lower side of the center of the instrument panel reinforcement member.

In the mounting structure of a knee airbag device and an electric power steering drive motor according to the third aspect, since the center of gravity of the drive motor is positioned at the vehicle upper side of the center of the instrument panel reinforcement member, and the center of gravity of the knee airbag is positioned at the vehicle lower side of the center of the instrument panel reinforcement member, during acceleration or deceleration of a vehicle, the moments acting on the instrument panel reinforcement member due to the mass of the drive motor and the mass of the knee airbag device readily cancel each other out. Consequently, vibration of the steering column about the instrument panel reinforcement member during acceleration and deceleration of a vehicle can be suppressed.

A fourth aspect of the present invention is the mounting structure of a knee airbag device and an electric power steering drive motor of any one of the first aspect to the third aspect, wherein: the position of the center of gravity of the drive motor is off-set to one side in the vehicle width direction with respect to the steering column; and the inflator is disposed with respect to the center of the steering column in the vehicle width direction at the opposite side to the side of the center of gravity of the drive motor.

In the mounting structure of a knee airbag device and an electric power steering drive motor according to the fourth aspect, since the position of the center of gravity of the drive motor is off-set to one side in the vehicle width direction with respect to the steering column, and the inflator is disposed with respect to the center of the steering column in the vehicle width direction at the opposite side to the side of the center of gravity of the drive motor, moments acting on the steering column due to the mass of the drive motor and the mass of the knee airbag device readily cancel each other out. Consequently, vibration about an axial line of the steering column can be effectively suppressed.

A fifth aspect of the present invention is the mounting structure of a knee airbag device and an electric power steering drive motor according to the fourth aspect, wherein the drive motor is mounted in a state such that an axial line of the drive motor is inclined to one side in the vehicle width direction with respect to an axis passing along the vehicle vertical direction through the center of the steering column.

In the mounting structure of a knee airbag device and an electric power steering drive motor according to the fifth aspect, since the axial line of the drive motor is in an inclined state to one side in the vehicle width direction with respect to an axis passing along the vehicle vertical direction through the center of the steering column, height position of the top end of the drive motor can be suppressed low, and effective utilization can be made of the limited space within the instrument panel.

A sixth aspect of the present invention is the mounting structure of a knee airbag device and an electric power steering drive motor of the first aspect, wherein: the steering column includes a telescopic mechanism capable of adjusting the front-rear position of a steering wheel within a specific range, and an impact-absorbing mechanism capable of absorbing impact by contracting within a specific stroke range when a load of a specific value or greater is input from the steering wheel side to the axial direction front side; the inflator is provided substantially parallel to an axial line of the steering column, at a position on the movable side when the steering column contracts due to the impact-absorbing mechanism; and the drive motor is disposed in a region so as not to interfere with the inflator when the steering column contracts due to the impact-absorbing mechanism when in a state in which the front-rear position of the steering wheel is positioned at the furthest forward position due to the telescopic mechanism.

In the mounting structure of a knee airbag device and an electric power steering drive motor according to the sixth aspect, the front-rear position of the steering wheel can be adjusted as desired by extending and contracting the steering column using the telescopic mechanism. Furthermore, due to the impact-absorbing mechanism, when a load of a specific value or greater is input from the steering wheel side towards the front side in the axial direction of the steering column, the steering column contracts within the specific stroke, and the impact can be absorbed. The inflator is provided at a location of the movable side when the steering column contracts due to the impact-absorbing mechanism, however, the drive motor of the electric power steering device is disposed in a region so as not, to interfere with the inflator when the steering column contracts due to the impact-absorbing mechanism when in a state in which the front-rear position of the steering wheel is positioned at the furthest forward position due to the telescopic mechanism. Consequently, in the impact-absorbing mechanism, sufficient impact-absorbing stroke of the steering column can be secured.

A seventh aspect of the present invention is the mounting structure of a knee airbag device and an electric power steering drive motor of any one of the first aspect to the sixth aspect, wherein a load transmission member is disposed between the instrument panel that is positioned in front of the knee portion of the driver in the vehicle forward direction and the instrument panel reinforcement member, the load transmission member being capable of transmitting load that has been input to the instrument panel from the knee portion of the driver to the instrument panel reinforcement member when the knee portion is restrained by the knee airbag.

In the mounting structure of a knee airbag device and an electric power steering drive motor according to the seventh aspect, during frontal impact of a vehicle, since the knee airbag deploys from within the column cover to the side of the knee portion of the driver, the knee portion of the driver can be restrained by the knee airbag. When this occurs, a load due to inertial force of the driver is input from the knee portion to the instrument panel through the knee airbag. This load is transmitted to the instrument panel reinforcement member through the load transmission member. Consequently, during a frontal impact of a vehicle, displacement of the instrument panel reinforcement member toward the vehicle rear can be suppressed, even when impact load is input to the instrument panel reinforcement member through the power plant and the drive motor.

Effect of the Invention

As explained above, according to the mounting structure of a knee airbag device and an electric power steering drive motor of the first aspect of the present invention, the excellent effect is obtained of being able to improve the mass balance about the instrument panel reinforcement member in a mounting structure of a knee airbag device and a drive motor of an electric power steering device to a steering column.

According to the mounting structure of a knee airbag device and an electric power steering drive motor of the second aspect of the present invention, the excellent effect is obtained in that vibration of the steering column about the instrument panel reinforcement member can be effectively suppressed during normal operation.

According to the mounting structure of a knee airbag device and an electric power steering drive motor of the third aspect of the present invention, the excellent effect is obtained in that vibration of the steering column about the instrument panel reinforcement member can be effectively suppressed during acceleration and deceleration of a vehicle.

According to the mounting structure of a knee airbag device and an electric power steering drive motor of the fourth aspect of the present invention, the excellent effect is obtained in that vibration about the axial line of the steering column can be effectively suppressed.

According to the mounting structure of a knee airbag device and an electric power steering drive motor of the fifth aspect of the present invention, the excellent effect is obtained in that effective utilization can be made of the limited space within the instrument panel.

According to the mounting structure of a knee airbag device and an electric power steering drive motor of the sixth aspect of the present invention, the excellent effect is obtained in that in the impact-absorbing mechanism, sufficient impact-absorbing stroke of the steering column can be secured.

According to the mounting structure of a knee airbag device and an electric power steering drive motor of the seventh aspect of the present invention, the excellent effect is obtained in that displacement of the instrument panel reinforcement member towards to the vehicle rear can be suppressed during frontal impact of a vehicle.

BRIEF DESCRIPTION OF THE DRAWINGS

FIG. 1 to FIG. 6 are according to a first exemplary embodiment.

FIG. 1 is a vertical cross-section showing a mounting structure of a knee airbag device and an electric power steering drive motor.

FIG. 3 is a view of the mounting structure of a knee airbag device and an electric power steering drive motor, in the state as viewed along the arrow 3 of FIG. 2A.

FIG. 4 is a schematic diagram showing an exemplary modification of a mounting structure of a knee airbag device and an electric power steering drive motor.

FIG. 5 is a vertical cross-section showing a state in which the head portion of a driver is restrained by a deployed airbag-body, and the knee portion of the driver is restrained by a deployed knee airbag.

FIG. 6 is a vertical cross-section showing a state in which the steering column is contracted from the state of FIG. 5 due to an impact-absorbing mechanism.

FIG. 7 is a vertical cross-section showing a mounting structure of a knee airbag device and an electric power steering drive motor.

FIG. 8 is a vertical cross-section showing, when the knee portion of a driver is restrained by a deployed knee airbag, a state in which the load input from the knee portion to an instrument panel through the knee airbag, is transmitted to the instrument panel reinforcement through a load transmission member, thereby suppressing displacement of the instrument panel reinforcement toward the vehicle rear direction, during a frontal impact of a vehicle.

BEST MODE OF IMPLEMENTING THE INVENTION

Figure 1:
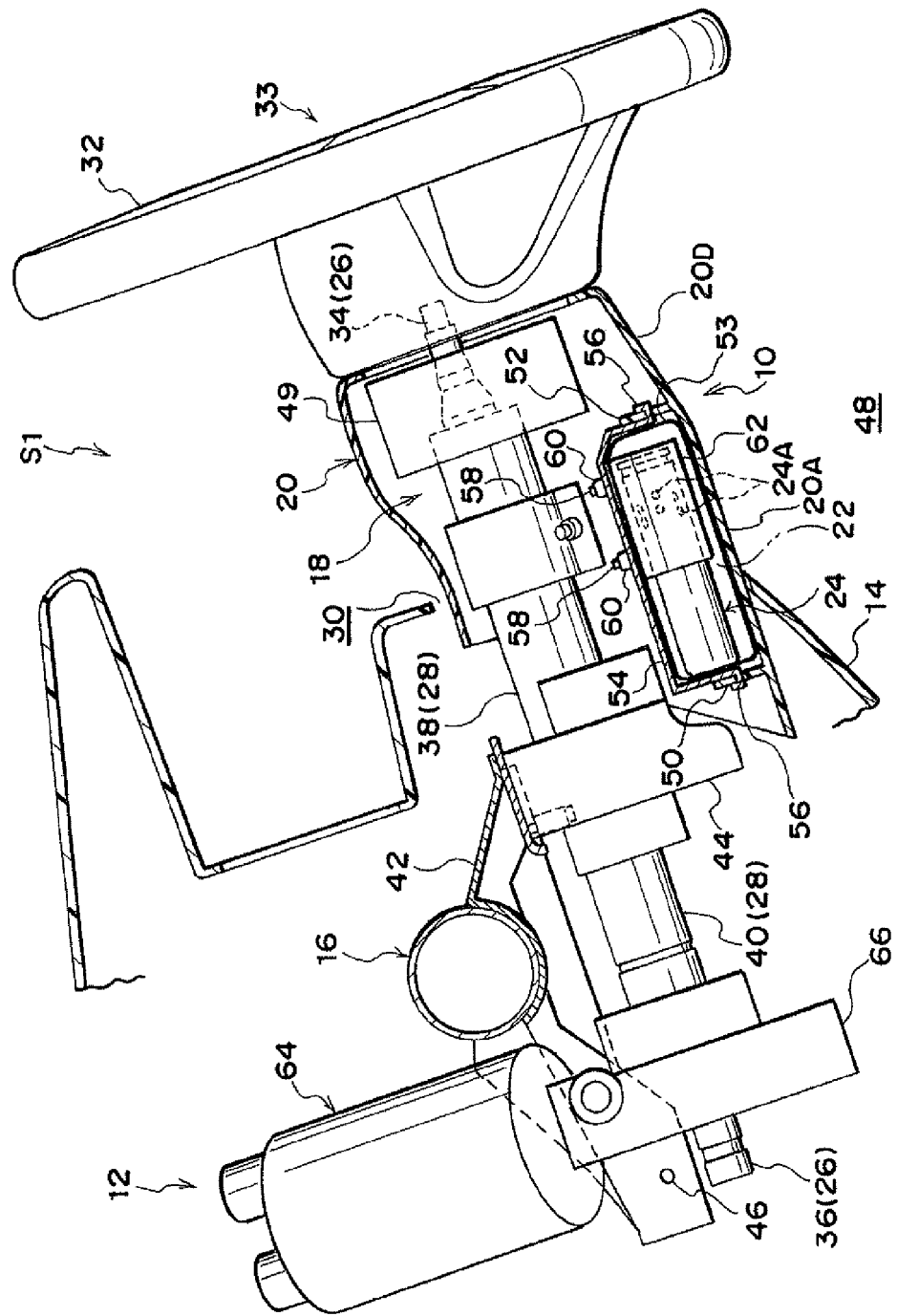

Explanation follows of exemplary embodiments of the present invention, with reference to the drawings.
First Exemplary Embodiment In FIG. 1, the mounting structure S1 of a knee airbag device and an electric power steering drive motor according to the present exemplary embodiment includes a knee airbag device 10, and a drive motor 64 for an electric power steering device 12.

The knee airbag device 10 is disposed at a lower outer peripheral face side of a steering column 18 within a column cover 20 covering the rear end side of the steering column 18 which is supported by an instrument panel reinforcement member 16 extending inside an instrument panel 14 along a vehicle width direction, is configured including a knee airbag 22 in a folded state and an inflator 24 capable of supplying gas to the knee airbag 22. The knee airbag 22 is capable of, when supplied with gas, inflating and deploying from inside the column cover 20 out towards the side of knee portions 23K of a driver 23. The instrument panel reinforcement member 16 is, for example, a reinforcement member of round pipe shape, joined at both vehicle width direction ends thereof to a vehicle body (not shown in the figures).

Figure 5:
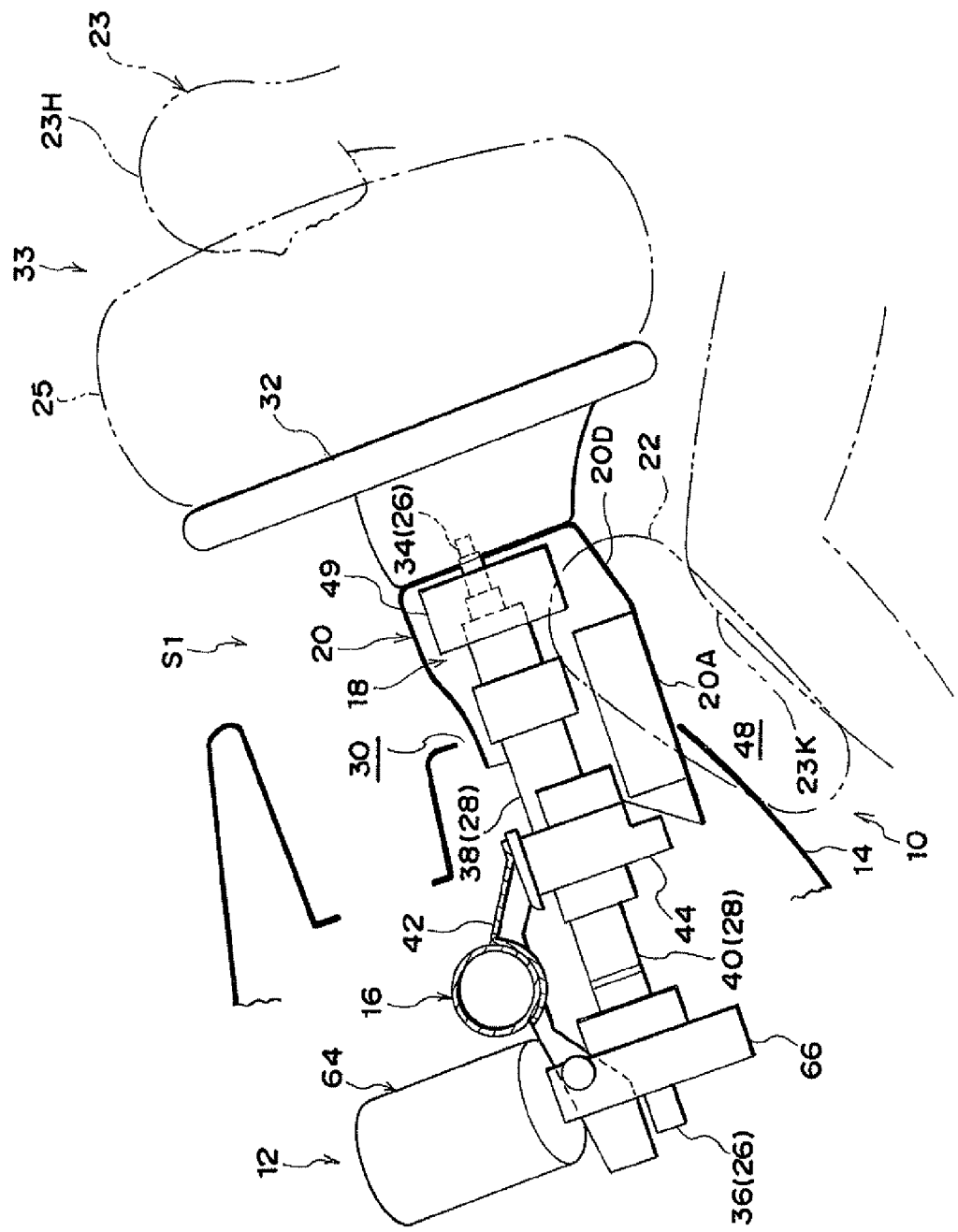

The steering column 18 is, for example, a steering column for a small car having a comparatively short overall length. The steering column 18 is configured with a steering main shaft 26 disposed at an axial core portion, and a column tube 28 covering the steering main shaft 26 and supported by the vehicle body. The steering column 18 is inserted through an opening 30 provided in the instrument panel 14, and protrudes out further towards the vehicle rear direction than the instrument panel 14. A steering wheel 32 for steering the vehicle is attached to a rear end portion of the steering main shaft 26. As shown in FIG. 5, the steering wheel 32 is provided with a driver-side airbag device 33. The driver-side airbag device 33 includes an airbag bag-body 25 that, for example during frontal impact of the vehicle, deploys and inflates when supplied with gas from an inflator, not shown in the figures, and is capable of restraining the head 23H and the chest region (not shown in the figures) of the driver 23.

In FIG. 1, the steering column 18 has, for example, a tilt function and a telescopic function, and is configured such that the steering main shaft 26 and the column tube 28 are contractible in the axial direction of the steering main shaft 26. Specifically, the steering main shaft 26 is divided into an upper steering main shaft 34 disposed at the vehicle rear side, and a lower steering main shaft 36 disposed at the vehicle front side. A front end portion of the upper steering main shaft 34 and a rear end portion of the lower steering main shaft 36 are connected together with a spline fitting of a specific overlap margin. Consequently, the steering main shaft 26 is capable of adjusting the front-rear position of the steering wheel 32 by telescopic operation. Furthermore, the steering column 18 has an impact-absorbing mechanism, such that when a load of a specific value or greater is input from the steering wheel 32 side towards the axial direction front side, the steering column 18 contracts within a specific stroke range, and is thereby capable of absorbing the impact (is capable of moving in the axial direction).

Due to the upper steering main shaft 34 and the lower steering main shaft 36 being coupled together with the spline fitting, one cannot rotate relative to the other. In this manner, steering force imparted to the steering wheel 32 is transmitted through the steering main shaft 26 to an intermediate shaft (not shown in the figures), and then further transmitted to the steering gear box. Furthermore, the intermediate shaft also is of a contractible structure similar to that of the steering main shaft 26, and the intermediate shaft is contractible (movable in the axial direction) within a specific stroke range due to load of a specific value or greater (thrust load) being input from the steering gear box (not shown in the figures).

The column tube 28 is of a double-tube construction, with an outer tube 38 disposed at the vehicle rear side, and an inner tube 40 disposed at the vehicle front side. Note that the steering main shaft 26 is supported within the column tube 28 so as to be relatively rotatable via bearings, not shown in the figures. In the example shown in the figures, the diameter of the outer tube 38 is set as a larger diameter than the inner tube 40, however the diameter size relationship may be set as the reverse to that of this exemplary embodiment.

The column tube 28 described above is supported on the instrument panel reinforcement member 16. Specifically, a steering support 42 is fixed, for example by welding, to the instrument panel reinforcement member 16, at a position, in a plane view of the vehicle, where the steering column 18 is disposed. A column bracket 44 that is disposed, for example, so as to straddle the steering column 18, is fastened by, for example, bolts to a lower portion at the rear end of the steering support 42. The steering column 18 is normally fixed with respect to the column bracket 44, during normal condition that tilting operation or telescoping operation is not being performed.

A bracket (not shown in the figures) that is fixed to the vehicle upper side of the inner tube 40, is connected, via a pin 46, to a lower portion at the front end of the steering support 42. The steering column 18 is configured so as to be capable of tilting operation by swinging in the vehicle up-down direction about the pin 46. Note that the tilting mechanism and the telescopic mechanism of the steering column 18 may be either manual or electric.

The column bracket 44 is configured so as to separate from the steering support 42 when a load of the specific amount or greater is input from the steering wheel 32 in the axial direction of the steering column 18. Due thereto, the steering column 18 can absorb impact by contracting towards the vehicle front.

Next, the column cover 20 is configured, for example, in a tubular shape, as a molded component made from a synthetic resin, for example. The column cover 20 is fixed, for example, to a combination switch 49 provided at the rear end of the steering column 18 (outer tube 38). A front wall portion 50 and a rear wall portion 52 are provided to the inside face of a bottom wall 20D of the column cover 20, for example integrally provided protruding out from the column cover 20, in order to control the deployment direction of the knee airbag 22 and promote inflation and deployment towards the side of a vehicle cabin 48. The front wall portion 50 is provided adjacent to the vehicle front side of the knee airbag device 10, and the rear wall portion 52 is provided adjacent to the vehicle rear side of the knee airbag device 10. For example, plural through holes are formed in the front wall portion 50 and the rear wall portion 52, respectively, in regular lines along the vehicle width direction. The module case 53 covering the knee airbag 22 and the inflator 24 is covered, for example, by a reaction force member 54 made from metal. The reaction force member 54 is, for example, latched to through holes in the front wall portion 50 and the rear wall portion 52, respectively, using latching fittings 56 formed, for example, in substantially J-shapes.

An airbag door 20A is provided corresponding to the knee airbag device 10 in a lower portion of the column cover 20. The airbag door 20A deploys to the vehicle cabin 48 side when acted on by an inflation force of the knee airbag 22 of a specific value or greater, and is configured so as to enable an opening (not shown in the figures) to be formed for the knee airbag 22 to protrude out from.

The inflator 24 is actuated by a spark current from an airbag ECU, not shown in the figures, and is a gas supply source capable of supplying gas to the knee airbag 22, configured, for example, in a substantially circular cylindrical shape. As the inflator 24, both a type of inflator that is filled with a gas generating agent, and a type of inflator that is charged with high pressure gas, may be employed.

As a brief explanation of an exemplary configuration of the inflator 24, when a gas generating agent filled type, configuration is, for example, from: a housing of circular bottomed-cylinder shape, formed with plural gas ejection holes 24A in a peripheral face; a gas generating agent disposed in the housing that generates gas due to combustion; a filter that removes fragments after combustion of the gas generating agent; and a firing device of an electric ignition device that is mounted to an end portion at the opening side of the housing and causes the gas generating agent to combust.

When a high pressure gas charged type, configuration is made with: a housing of circular bottomed-cylinder shape; a high pressure partition wall disposed within the housing; a gas mixture of argon, helium or the like charged in a compartment partitioned by the high pressure partition wall and the housing; a moving member that is movably disposed in the vicinity of the high pressure partition wall and that ruptures the high pressure partition wall by moving; and a firing device of an electrical ignition device mounted to an end portion at the opening side of the housing and that moves the moving member. In the knee airbag device 10, a high pressure gas type of inflator 24 is often employed due to the gas volume of the knee airbag 22 being comparatively small.

Stud bolts 58 are provided protruding out from the inflator 24, with a length that passes through the module case 53 and the reaction force member 54. The reaction force member 54 and the knee airbag device 10 are sub-assembled by fastening nuts 60 to the stud bolts 58 from the vehicle upper side. In the above described manner, the reaction force member 54 is latched to the front wall portion 50 and the rear wall portion 52 of the column cover 20, and the column cover 20 is fixed, for example, to the outer tube 38 at the rear end of the steering column 18, with the combination switch 49 interposed therebetween. The outer tube 38, the combination switch 49, the column cover 20, the steering wheel 32 and the like are at locations on the movable side when the steering column 18 contracts due to the impact-absorbing mechanism. Namely, the inflator 24 is provided on the movable side when the steering column 18 contracts due to the impact-absorbing mechanism.

Furthermore, the inflator 24 is positioned in the module case 53, for example, directly below the column tube 28 in the steering column 18, and is disposed substantially parallel to an axial line of the steering column 18. As additional explanation: an axial line of the inflator 24 is set so as to be substantially parallel to an axial line of the column tube 28 in the steering column 18. The gas ejection holes 24A of the inflator 24 are, for example, disposed at the vehicle rear side. Note that the disposition of the inflator 24 is not limited to this disposition. Furthermore, in the example in the figures, a diffuser 62 is provided in the peripheral range of the gas ejection holes 24A of the inflator 24 to control the flow of gas ejected from the gas ejection holes 24A.

The electric power steering device 12 is configured with, attached to the steering column 18, the drive motor 64, this being the drive source used for power assisted steering, and the worm gear mechanism 66 that transmits the assisting torque generated by the drive motor 64 to the lower steering main shaft 36. The drive motor 64 is mounted to the vehicle front side, this being the opposite side with respect to the instrument panel reinforcement member 16 to the side of the knee airbag device 10.

Figure 2A:
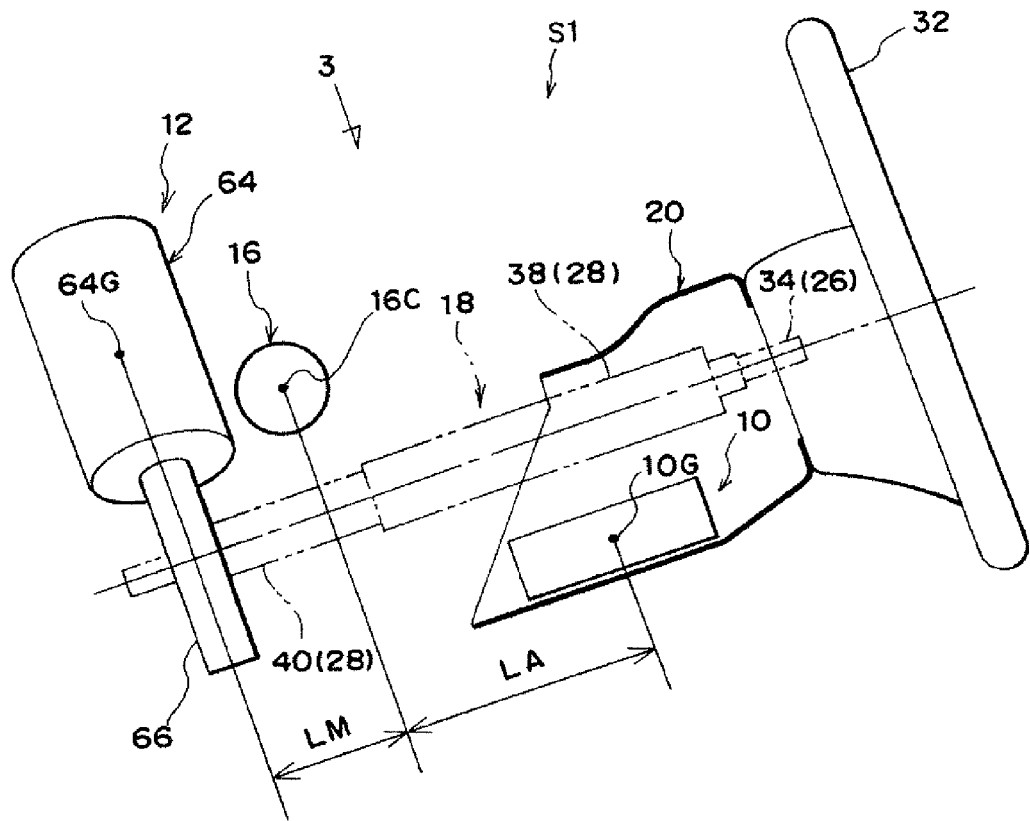
FIG. 2A is a schematic diagram showing, in a mounting structure of a knee airbag device and an electric power steering drive motor, a positional relationship between the electric power steering device and the knee airbag device as viewed from the side of a vehicle.
Figure 3:
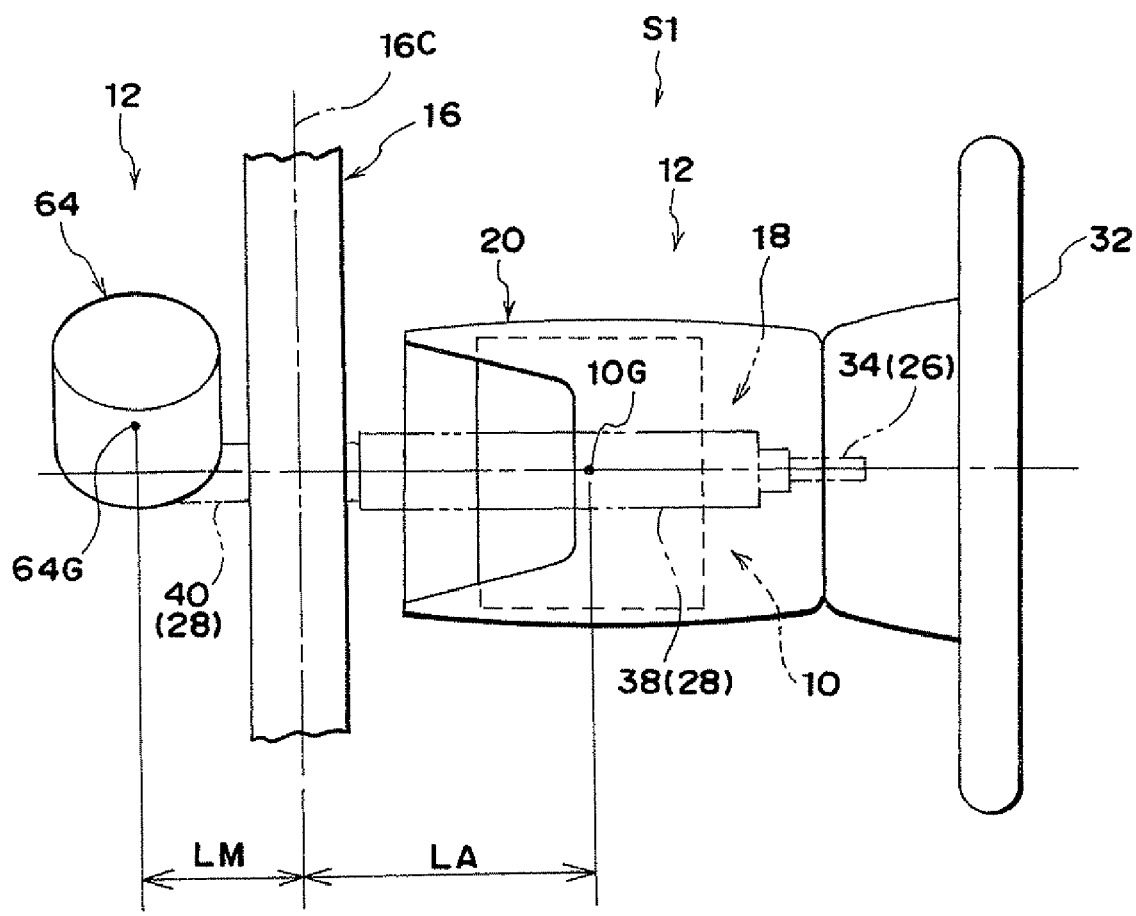

Furthermore, as shown in FIG. 2A and FIG. 3, separation distance LM along the axial direction of the steering column between the center of gravity 64G of the drive motor 64 and the center 16C of the instrument panel reinforcement member 16 is set shorter than a separation distance LA along the axial direction of the steering column 18 between the center 16C of the instrument panel reinforcement member 16 and the center of gravity 10G of the knee airbag device 10. This is because generally, in contrast to the mass of the drive motor 64 of 2 to 3 kg, the mass of the knee airbag device 10 is less than 1 kg, with the drive motor 64 being heavier than the knee airbag device 10.

In addition, as shown in FIG. 2A, the center of gravity 64G of the drive motor 64 is disposed at the vehicle upper side of the center 16C of the instrument panel reinforcement member 16, and the center of gravity 10G of the knee airbag device 10 is disposed at the vehicle lower side of the center 16C of the instrument panel reinforcement member 16.

Figure 4:
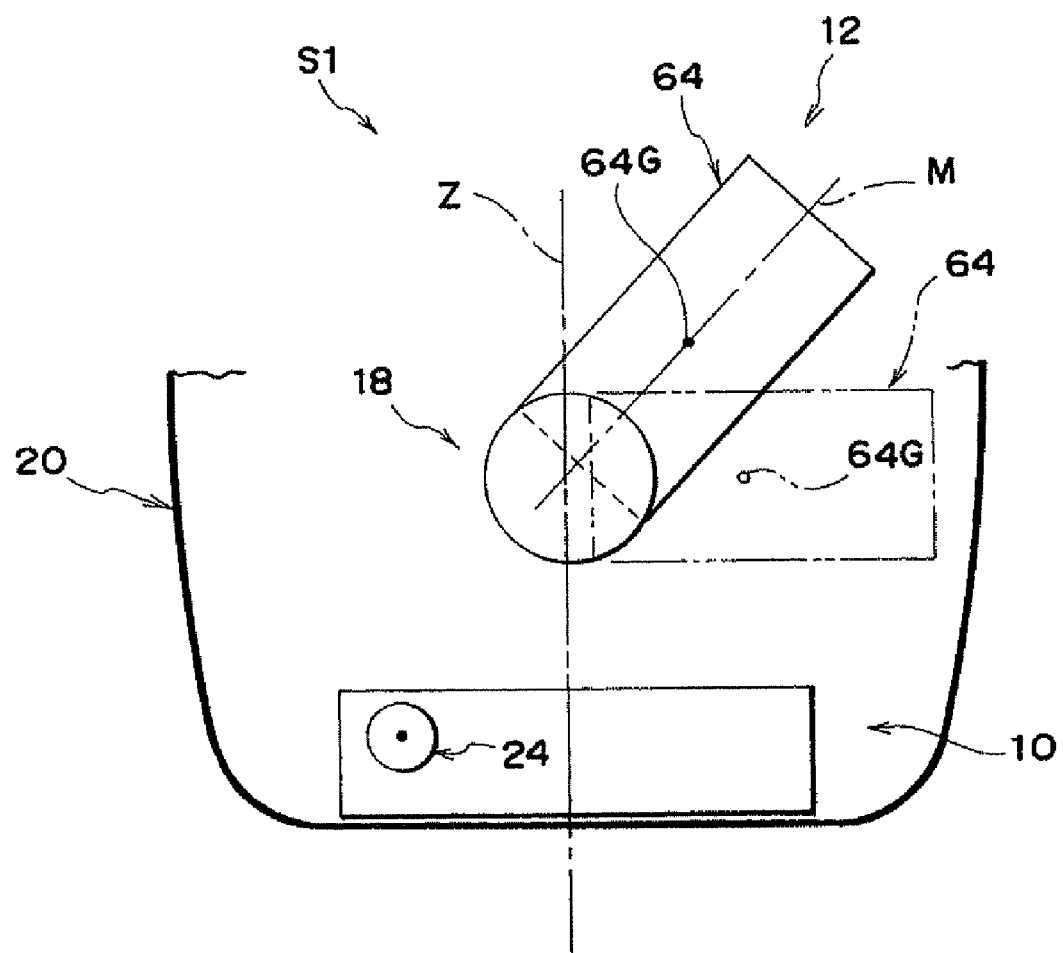

As shown in FIG. 4, the drive motor 64 is mounted in a state, as shown by the solid lines, with the axial line M of the drive motor 64 inclined to one side in the vehicle width direction (for example, in the vehicle right side) with respect to the axis Z passing through the center of the steering column 18 in the vehicle vertical direction, or in a state, as shown in by the double-dashed broken lines, with the axial line M lying horizontal. By disposition of the drive motor 64 in such a manner, the height position at the top end of the drive motor 64 can be suppressed low, and limited space within the steering column 18 can be effectively utilized. Note that disposition of the inflator 24 in FIG. 4 is explained below in an exemplary modification.

Figure 6:
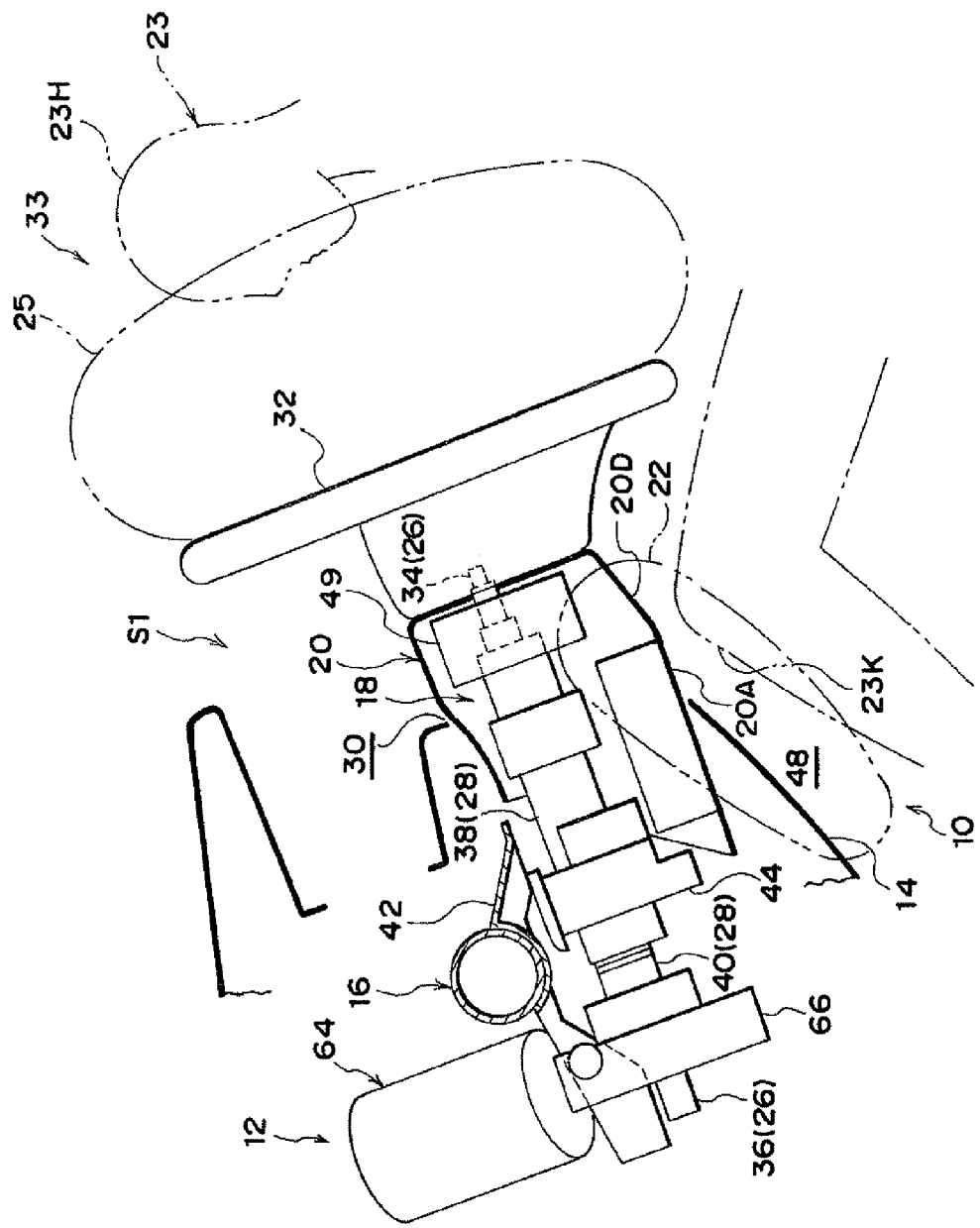

Furthermore, as shown in FIG. 5 and FIG. 6, the drive motor 64 is disposed in a region so as not to interfere with the inflator 24 when the steering column 18 has contracted due to the impact-absorbing mechanism in the state in which the front-rear position of the steering wheel 32 is made the furthest forward position using the telescopic mechanism.

Operation

Explanation follows of operation of the present exemplary embodiment configured as described above. In FIG. 1 and FIG. 2A, in the mounting structure S1 of a knee airbag device and an electric power steering drive motor according to the present exemplary embodiment, the drive motor 64 of the electric power steering device 12 is mounted to the vehicle front side, this being the opposite side with respect to the instrument panel reinforcement member 16 to the side of the knee airbag device 10. In other words, the knee airbag device 10 is mounted to the vehicle rear side of the instrument panel reinforcement member 16, and the electric power steering device 12 is mounted to the vehicle front side of the instrument panel reinforcement member 16.

Since the steering column 18 has a telescopic mechanism, the front-rear position of the steering wheel 32 is capable of adjustment within a specific range by extension and contraction of the steering column 18 using telescopic operation. Furthermore, since the steering column 18 has an impact-absorbing mechanism, impact can be absorbed by contraction within a specific stroke range when a load of a specific value or greater is input from the steering wheel 32 side to the axial direction forward side.

In the present exemplary embodiment, since the drive motor 64 is mounted at the vehicle front side with respect to the instrument panel reinforcement member 16, this being the opposite side to the side of the knee airbag device 10, a state is achieve in which the position of the knee airbag device 10 and the position of the electric power steering device 12 are further apart, in comparison to cases where the drive motor 64 is disposed at the vehicle rear side of the instrument panel reinforcement member 16. The inflator 24 of the knee airbag device 10 is provided on the movable side when the steering column 18 contracts due to the impact-absorbing mechanism, in a position such that the drive motor 64 of the electric power steering device 12 does not interfere with the inflator 24 even if the steering column 18 contracts due to the impact-absorbing mechanism when in a state in which the front-rear position of the steering wheel 32 is in the furthest forward position due to the telescopic mechanism. Consequently, interference between the inflator 24 and the drive motor 64, when the steering column 18 contracts and absorbs impact, is suppressed.

Specifically, in FIG. 1, when an airbag ECU determines that a frontal impact has occurred on the basis of a signal from an impact sensor, not shown in the figures, actuation current flows from the airbag ECU to the inflator (not shown in the figures) of the driver-side airbag device 33 and to the inflator 24 of the knee airbag device 10, respectively, and each of the inflators is actuated. In FIG. 5, when the inflator is actuated in the driver-side airbag device 33, inflation gas is supplied from the inflator to the airbag bag-body 25, and the airbag bag-body 25 inflates and deploys between the steering wheel 32 and the head 23H of the driver 23. The head 23H and the chest region (not shown in the figures) of the driver 23 are restrained by the airbag bag-body 25. When this occurs, inertial force of the head 23H and the like is input to the airbag bag-body 25.

In FIG. 1, in the knee airbag device 10, inflation gas is supplied from the gas ejection holes 24A of the inflator 24, via the diffuser 62, to the knee airbag 22, and the knee airbag 22 starts to inflate and deploy. When this occurs, the inflation force of the knee airbag 22 acts on the airbag door 20A provided at a portion below the reaction force member 54 and the column cover 20, however, inflation in the vehicle upward side is restrained by the reaction force member 54, and inflation in the vehicle front-rear directions is restrained by the front wall portion 50 and the rear wall portion 52. Hence, the inflation force of the knee airbag 22 acts effectively on the airbag door 20A, and the airbag door 20A deploys to the vehicle cabin 48 side when in receipt of inflation force of a specific value or greater. An opening (not shown in the figures) is thereby formed in the column cover 20 for the knee airbag 22 to protrude out from. As shown in FIG. 5, the knee airbag 22 protrudes out through the opening to the vehicle cabin 48 side, and inflates and deploys between the instrument panel 14 and the knee portions 23K of the driver 23. The knee portions 23K of the driver 23 are thereby restrained by the knee airbag 22.

As shown in FIG. 6, when the inertial force due to the head 23H of the driver 23 and the like is a specific value or greater, this impact is absorbed by actuation of the impact-absorbing mechanism of the steering column 18. Specifically, when load of a specific value or greater is input from the steering wheel 32 side to the axial direction front side, the steering column 18 contracts within a specific stroke range, due to the column bracket 44 detaching from the steering support 42. When this occurs, the outer tube 38, the combination switch 49, the steering wheel 32, and the like, in locations at the movable side of the steering column 18, move together with the knee airbag device 10 towards the axial forward direction of the steering column 18. As shown in FIG. 1, the comparatively high rigidity inflator 24 is disposed in the knee airbag device 10, however in the present exemplary embodiment, since interference of the inflator 24 and the drive motor 64 of the electric power steering device 12 is suppressed, as described above, sufficient impact-absorbing stroke of the steering column 18 can be secured.

Figure 2B:
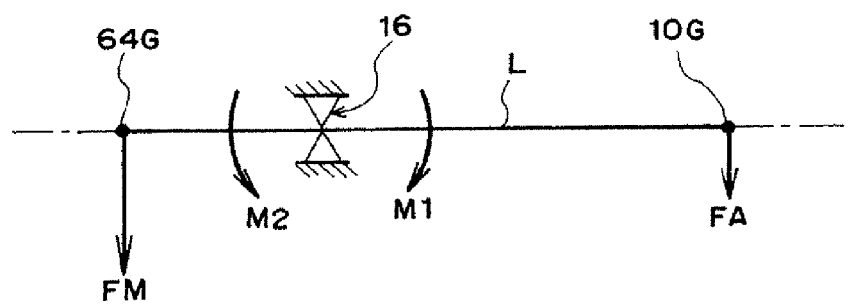
FIG. 2B is a schematic diagram showing a mounting structure of a knee airbag device and an electric power steering drive motor, which is replaced with a structure of a beam supported by an instrument panel reinforcement member as a fixed point.

Furthermore, as shown in FIG. 2A, the position of the center of gravity 64G of the comparatively heavy drive motor 64 is set nearer to the instrument panel reinforcement member 16 than the position of the center of gravity 10G of the comparatively light knee airbag device 10. Hence, as shown in FIG. 2B, the difference between the size of the moment M2 acting on the instrument panel reinforcement member 16 due to the load FM from the mass of the drive motor 64, and the size of the moment M1 acting on the instrument panel reinforcement member 16 due to the load FA from the mass of the knee airbag device 10, becomes smaller. FIG. 2B is a schematic diagram showing the mounting structure S1 of a knee airbag device and an electric power steering drive motor of FIG. 2A, which is replaced with a structure of a beam L supported by the instrument panel reinforcement member 16 as a fixed point. On the page, the position of the center of gravity 64G of the drive motor 64 (FIG. 2A) is at the left end of the line L, and the position of the center of gravity 10G of the knee airbag device 10 (FIG. 2A) is at the right end of the line L.

In FIG. 2B, due to the actions of these moments being in opposite directions to each other, the moments cancel each other out. Consequently, when mounting the electric power steering device 12 and the knee airbag device 10 to the steering column 18, the mass balance in the front-rear direction of the steering column 18 about the instrument panel reinforcement member 16 can be improved. Due thereto, vibration of the steering column 18 about the instrument panel reinforcement member 16 can also be effectively suppressed during normal operation.

Furthermore, as shown in FIG. 2A, in the mounting structure S1 of the knee airbag device and the electric power steering device according to the present exemplary embodiment, the center of gravity 64G of the drive motor 64 is positioned to the vehicle upper side of the center 16C of the instrument panel reinforcement member 16, and the center of gravity 10G of the knee airbag device 10 is positioned to the vehicle lower side of the center 16C of the instrument panel reinforcement member 16. Hence, when the vehicle accelerates or decelerates, moments acting on the instrument panel reinforcement member 16 due to the mass of the drive motor 64 and the mass of the knee airbag device 10 readily cancel each other out (not shown in the figures). Consequently, vibration of the steering column 18 about the instrument panel reinforcement member 16 during acceleration and deceleration can be effectively suppressed.

Exemplary Modification

In the example shown in FIG. 4, the drive motor 64 is mounted in a state, as shown by the solid lines, with the axial line M of the drive motor 64 inclined to one side in the vehicle width direction (for example, the vehicle right side) with respect to the axis Z passing through the center of the steering column 18 in the vehicle vertical direction, or in a state, as shown in by the double-dashed broken lines, with the axial line M lying horizontal. By disposition of the drive motor 64 in such a manner, the position of the center of gravity 64G of the drive motor 64 is off-set to one side in the vehicle width direction (the vehicle right side) with respect to the steering column 18. In consideration thereof, the inflator 24 may be disposed at the opposite side in the vehicle width direction (vehicle left side) with respect to the axial center of the steering column 18 to the side of the center of gravity 64G of the drive motor 64.

In this example, the position of the center of gravity 64G of the drive motor 64 is disposed off set to one side in the vehicle width direction with respect to the steering column 18, and, from the components configuring the knee airbag device 10, the comparatively heavy inflator 24 is disposed off-set to the opposite side in the vehicle width direction with respect to the steering column 18 from that of the center of gravity 64G of the drive motor 64. Consequently, moments acting on the steering column 18 due to the mass of the drive motor 64 and the mass of the knee airbag device 10 readily cancel each other out (not shown in the figures). Due thereto, the mass balance about the axial line of the steering column 18 can be improved. Furthermore, due thereto, vibration about the axial line of the steering column 18 can also be effectively suppressed.

Second Exemplary Embodiment

Figure 7:
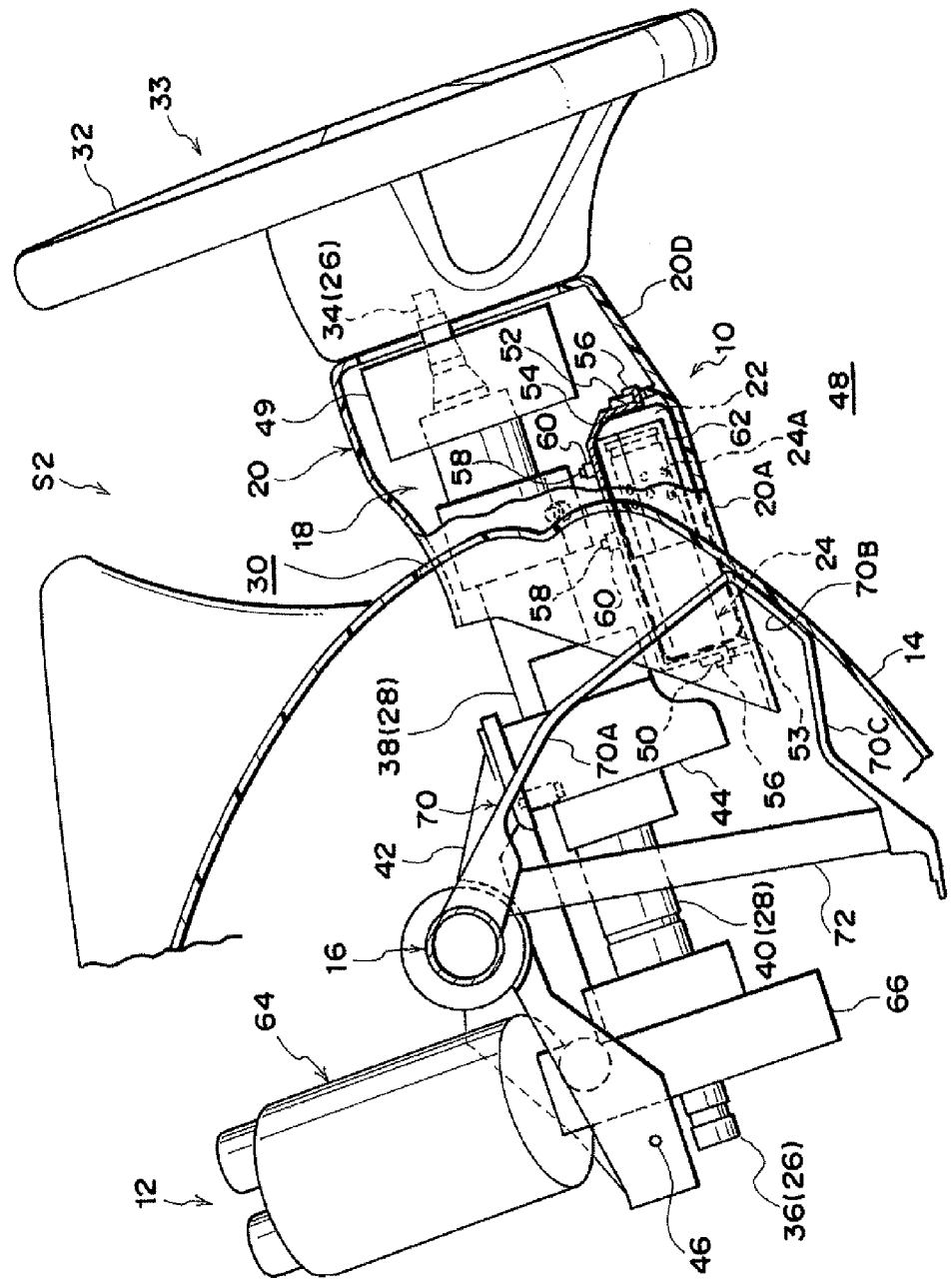
FIG. 7 and FIG. 8 are according to a second exemplary embodiment.
Figure 8:
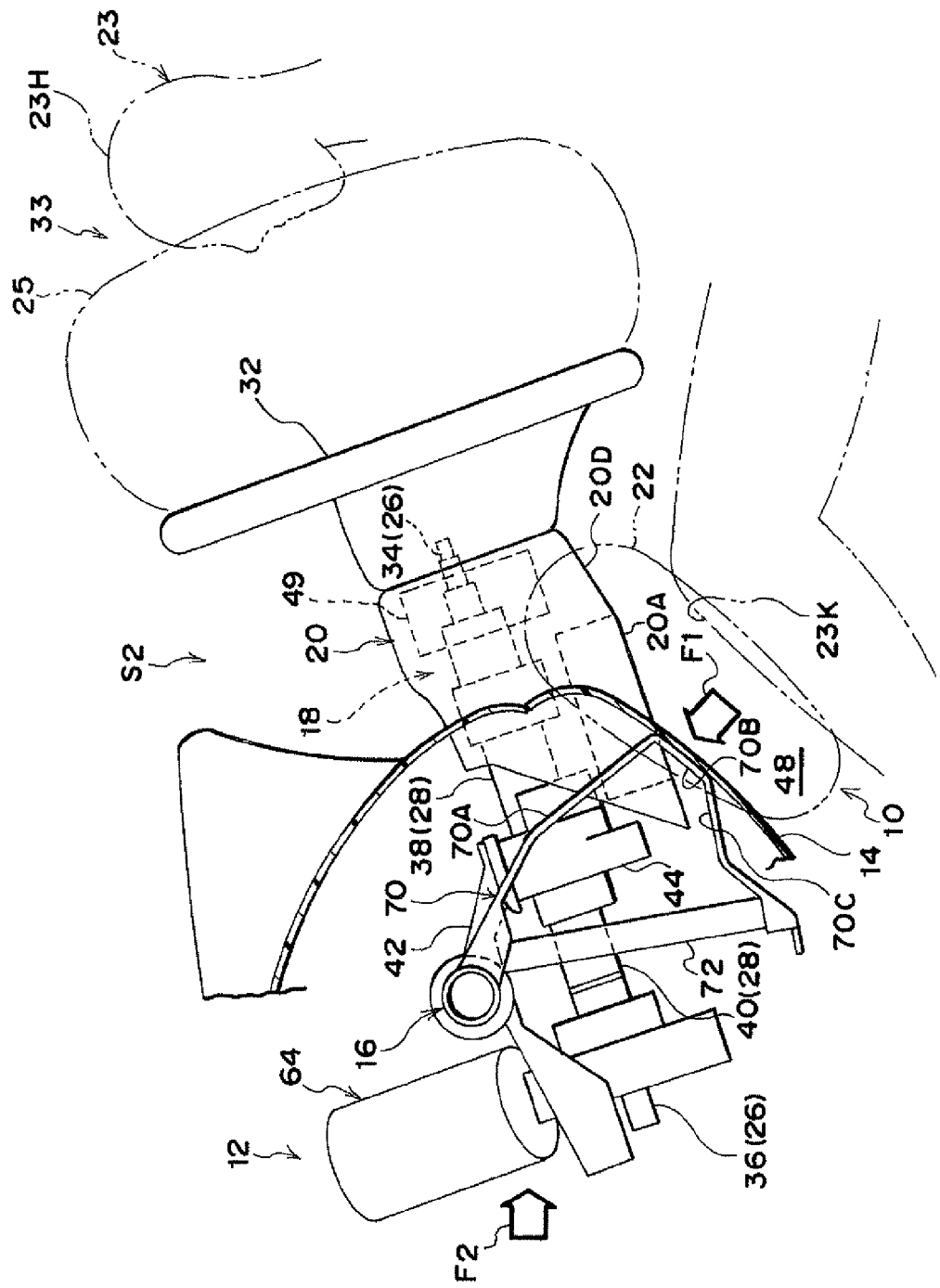

In FIG. 7, in a mounting structure S2 of the knee airbag device and the electric power steering device according to the present exemplary embodiment, a load transmission member 70 is disposed between the instrument panel 14 that is positioned in front of the knee portions 23K of the driver 23 (FIG. 8) in the vehicle forward direction and the instrument panel reinforcement member 16, the load transmission member 70 being capable of transmitting load input to the instrument panel 14 from the knee portions 23K of the driver 23, when the knee portions 23K are restrained by the knee airbag 22, to the instrument panel reinforcement member 16. A pair of the load transmission members 70 is, for example, provided, for each side of the vehicle width direction of the steering column 18, so as to correspond to the knee portions 23K of the driver 23 (FIG. 8).

The load transmission member 70 has a general portion 70A, a load bearing portion 70B, and an extension portion 70C, and is further reinforced by a coupling member 72. The load transmission member 70 and the coupling member 72 configure a substantially triangular frame shaped body when viewed from the vehicle side, in order to have both high rigidity and low weight. A front end portion of the general portion 70A is fixed to the instrument panel reinforcement member 16, and the general portion 70A extends at an angle downward in the vehicle rearward direction to a position in the vicinity of, or making contact with, the back face of the instrument panel 14 at a position in front of the knee portions 23K in the vehicle forward direction. At a substantially central portion in the length direction, the general portion 70A is, for example, formed with a slight bend so as to protrude out to the vehicle upper side.

The load bearing portion 70B is a region extending to the vehicle lower side from the bottom end of the general portion 70A, along the back face of the instrument panel 14. The load bearing portion 70B is positioned in front of the knee portions 23K (FIG. 8) in the vehicle forward direction. The extension portion 70C is, for example, a region extending towards the vehicle front side from the bottom end of the load bearing portion 70B so as to be separated away from the instrument panel 14. The extension portion 70C and the front end portion of the general portion 70A are coupled together by the coupling member 72 extending in the vehicle vertical direction.

Note that the configuration of the load transmission member 70 and the coupling member 72 is not limited to the illustrated example thereof.

Other portions are similar to those of the first exemplary embodiment, and explanation thereof is omitted.

Operation

Explanation follows of operation of the present exemplary embodiment, configured as described above. In FIG. 8, in the mounting structure S2 of the knee airbag device and the electric power steering device according to the present exemplary embodiment, since the knee airbag 22 deploys from within the column cover 20 towards the side of the knee portions 23K of the driver 23 during a vehicle frontal impact, the knee portions 23K can be restrained by the knee airbag 22. When this occurs, a load F1 due to the inertial force of the driver 23, is input from the knee portions 23K to the instrument panel 14 via the knee airbag 22. This load F1 is transmitted to the instrument panel reinforcement member 16 through the load transmission member 70.

Specifically, since the load bearing portion 70B of the load transmission member 70 is in the vicinity of, or making contact with, the back face of the instrument panel 14, at a position in front of the knee portions 23K in the vehicle forward direction, the load F1 input from the knee portions 23K of the driver 23 to the instrument panel 14 through the knee airbag 22 is input to the load bearing portion 70B. The load F1 input that has been input to the load bearing portion 70B is mainly transmitted through the general portion 70A to the instrument panel reinforcement member 16.

Since the general portion 70A is formed with a slight bend at a substantially central portion in the length direction, so as to protrude out towards the vehicle upper side, the general portion 70A warps when the load is transmitted, enabling impact to be absorbed. Note that since the load transmission member 70 is reinforced by the coupling member 72, excessive deformation of the load transmission member 70 is suppressed when load is transmitted. Consequently, raising of load transmitting efficiency through the load transmission member 70 is enabled.

In this manner, since load due to the inertial force of the driver 23 is transmitted to the instrument panel reinforcement member 16 during a vehicle frontal impact, even when an impact load F2 is input to the instrument panel reinforcement member 16, through the power plant, such as the engine or the like (not shown in the figures) and the drive motor 64, this load is born by the instrument panel reinforcement member 16, and displacement of the instrument panel reinforcement member 16 toward the vehicle rear can be suppressed.

Note that in the present exemplary embodiment, the operation of the driver-side airbag device 33, the impact-absorbing mechanism provided to the steering column 18, and the like, are similar to those of the first exemplary embodiment.

Explanation of the Reference Numerals
10 knee airbag device
10G center of gravity
12 electric power steering device
14 instrument panel
16 instrument panel reinforcement member
16C center
18 steering column
20 column cover
22 knee airbag
23 driver
23K knee portions
24 inflator
32 steering wheel
64 drive motor
64G center of gravity
66 worm gear mechanism
70 load transmission member
70A general portion
70B load bearing portion
70C extension portion
72 coupling member
LA separation distance along the axial direction of the steering column between the center of the instrument panel reinforcement and the center of gravity of the knee airbag device
LM separation distance along the axial direction of the steering column between the center of gravity of the drive motor and the center of the instrument panel reinforcement member
M axial line of the drive motor
S1 mounting structure of an knee airbag device and an electric power steering drive motor
S2 mounting structure of an knee airbag device and an electric power steering drive motor
Z vehicle vertical axis

The invention claimed is:

1. A mounting structure of a knee airbag device and an electric power steering drive motor, the mounting structure comprising:
   a knee airbag device including, disposed at a lower outer peripheral face side of a steering column within a column cover covering a rear end side of the steering column which is supported by an instrument panel reinforcement member extending inside an instrument panel along a vehicle width direction, a knee airbag in a folded state and an inflator capable of supplying gas to the knee airbag, configured such that when the gas supply is received the knee airbag is capable of inflating and deploying from within the column cover toward a side of a knee portion of a driver;
   a drive motion in an electric power steering device, attached to the steering column as a drive source for power assisted steering and mounted at a vehicle front direction side with respect to the instrument panel reinforcement member, which is an opposite side to the side of the knee airbag device;
   the steering column comprising a telescopic mechanism capable of adjusting a front-rear position of a steering wheel within a specific range, and an impact-absorbing mechanism capable of absorbing impact by contracting within a specific stroke range when a load of a specific value or greater is input from a steering wheel side to an axial direction front side;
   the inflator being provided substantially parallel to an axial line of the steering column, at a position on a movable side when the steering column contracts due to the impact-absorbing mechanism; and
   the drive motor being disposed in a region so as not to interfere with the inflator when the steering column contracts due to the impact-absorbing mechanism when in a state in which the front-rear position of the steering wheel is positioned at the furthest forward position due to the telescopic mechanism.

2. The mounting structure of a knee airbag device and an electric power steering drive motor of claim 1, wherein a separation distance along an axial direction of the steering column between a center of gravity of the drive motor and a center of the instrument panel reinforcement member is set shorter than the separation distance along the axial direction of the steering column between the center of the instrument panel reinforcement member and a center of gravity of the knee airbag device.

3. The mounting structure of a knee airbag device and an electric power steering drive motor of claim 1, wherein:
   a center of gravity of the drive motor is positioned at a vehicle upper side of a center of the instrument panel reinforcement member; and
   a center of gravity of the knee airbag device is positioned at a vehicle lower side of the center of the instrument panel reinforcement member.

4. The mounting structure of a knee airbag device and an electric power steering drive motor of claim 1, wherein:
   a position of a center of gravity of the drive motor is off-set to one side in the vehicle width direction with respect to the steering column; and
   the inflator is disposed with respect to a center of the steering column in the vehicle width direction at an opposite side to a side of the center of gravity of the drive motor.

5. The mounting structure of a knee airbag device and an electric power steering drive motor of claim 4, wherein the drive motor is mounted in a state such that an axial line of the drive motor is inclined to one side in the vehicle width direction with respect to an axis passing along a vehicle vertical direction through the center of the steering column.

6. The mounting structure of a knee airbag device and an electric power steering drive motor of claim 1, wherein a load transmission member is disposed between the instrument panel that is positioned in front of the knee portion of the driver in a vehicle forward direction and the instrument panel reinforcement member, the load transmission member being capable of transmitting load that has been input to the instrument panel from the knee portion of the driver to the instrument panel reinforcement member when the knee portion is restrained by the knee airbag.

7. The mounting structure of a knee airbag device and an electric power steering drive motor of claim 6, wherein a pair of the load transmission members is provided, on each side in the vehicle width direction of the steering column, so as to correspond to both the knee portions of the driver.

8. The mounting structure of a knee airbag device and an electric power steering drive motor of claim 6, wherein the load transmission member comprises:
   a general portion, a front end portion of which is fixed to the instrument panel reinforcement member, and extending at a downward angle in a vehicle rearward direction to a position in a vicinity of, or making contact with, a back face of the instrument panel at a position in front of the knee portion in the vehicle forward direction;
   a load bearing portion, extending to a vehicle lower side from a bottom end of the general portion, along the back face of the instrument panel; and
   an extension portion, extending towards a vehicle front side from the bottom end of the load bearing portion so as to be separated away from the instrument panel.

9. The mounting structure of a knee airbag device and an electric power steering drive motor of claim 8, wherein:
   the load transmission member is reinforced by a coupling member extending in a vehicle up-down direction that couples the extension portion with the front end portion of the general portion; and
   the load transmission member and the coupling member substantially configure a triangular shaped frame body when viewed from a vehicle side.

10. The mounting structure of a knee airbag device and an electric power steering drive motor of claim 8, wherein a bend is formed at substantially a central portion in a length direction of the general portion so as to protrude out towards a vehicle upper side.

11. The mounting structure of a knee airbag device and an electric power steering drive motor of claim 1, wherein gas ejection holes of the inflator are disposed at the vehicle rear side.

* * * * *